US010328469B1

(12) United States Patent
Shah et al.

(10) Patent No.: US 10,328,469 B1
(45) Date of Patent: Jun. 25, 2019

(54) PILL MANAGEMENT DEVICE AND ASSOCIATED USE THEREOF

(71) Applicants: Binod Shah, Scarsdale, NY (US); Prasanna Shah, Scarsdale, NY (US)

(72) Inventors: Binod Shah, Scarsdale, NY (US); Prasanna Shah, Scarsdale, NY (US)

( * ) Notice: Subject to any disclaimer, the term of this patent is extended or adjusted under 35 U.S.C. 154(b) by 0 days.

(21) Appl. No.: 15/667,607

(22) Filed: Aug. 2, 2017

Related U.S. Application Data

(60) Provisional application No. 62/369,804, filed on Aug. 2, 2016.

(51) Int. Cl.
*B09B 3/00* (2006.01)
*A61J 7/00* (2006.01)
*B65F 1/00* (2006.01)

(52) U.S. Cl.
CPC ........... *B09B 3/0075* (2013.01); *A61J 7/0007* (2013.01); *B65F 1/002* (2013.01); *B65F 2240/145* (2013.01)

(58) Field of Classification Search
CPC ..... A61J 3/02; A61M 15/0056; B09B 3/0075; B65F 1/002; B65F 2240/145
See application file for complete search history.

(56) References Cited

U.S. PATENT DOCUMENTS

| | | | | | |
|---|---|---|---|---|---|
| 2,100,860 | A * | 11/1937 | Lobley | B02C 4/08 | 221/135 |
| 4,706,845 | A * | 11/1987 | Schnurer | A47F 1/08 | 221/102 |
| 4,955,497 | A * | 9/1990 | Winden | B65F 1/08 | 220/210 |
| 6,523,766 | B1 * | 2/2003 | Watt | A61J 7/0007 | 241/100 |
| 7,472,856 | B2 * | 1/2009 | Shears | A61J 3/02 | 241/285.2 |
| 7,703,712 | B2 * | 4/2010 | Chiu | B02C 18/144 | 241/100 |
| 2002/0179756 | A1 * | 12/2002 | Chen | A61L 11/00 | 241/99 |
| 2005/0127218 | A1 * | 6/2005 | Demske | A61J 7/0007 | 241/169 |
| 2007/0181724 | A1 * | 8/2007 | Shears | A61J 3/02 | 241/285.2 |
| 2014/0074283 | A1 * | 3/2014 | Blackburn | A61J 7/0076 | 700/237 |
| 2014/0151476 | A1 * | 6/2014 | Matlin | B02C 18/0007 | 241/36 |
| 2015/0283034 | A1 * | 10/2015 | Fernandez | B01F 7/162 | 241/46.17 |
| 2016/0158107 | A1 * | 6/2016 | Dvorak | A61J 7/0084 | 241/25 |
| 2017/0045217 | A1 * | 2/2017 | Bowden | F21V 33/0084 | |

* cited by examiner

*Primary Examiner* — Gene O Crawford
*Assistant Examiner* — Kelvin L Randall, Jr.
(74) *Attorney, Agent, or Firm* — Ashkan Najafi

(57) ABSTRACT

A pill management device includes a portable reservoir having a pill-receiving inlet and an access door spaced from the pill-receiving inlet, a pill-crushing mechanism disposed within the reservoir and configured to transform a solid pill, introduced via the pill-receiving inlet, to pill powder, and a locking mechanism in communication with the access door and the pill-receiving inlet for preventing unauthorized access to the pill powder housed within the reservoir. Advantageously, the locking mechanism locks the access door and the pill-receiving inlet.

2 Claims, 9 Drawing Sheets

PILL MANAGEMENT DEVICE AND ASSOCIATED USE THEREOF

CROSS REFERENCE TO RELATED APPLICATIONS

This is a non-provisional patent application that claims the benefit of U.S. provisional patent application No. 62/369,804 filed Aug. 2, 2016, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to pharmaceutical drug dispensers and, more particularly, to a specially designed pill management device, which when fed pills, automatically and conveniently eradicates expired and unused pills, and contains their waste within. Sensor operated and featuring a permanent lock to seal in the powdered waste, the pill management device provides consumers and medical professionals with a safer, simpler, and more effective means of medication disposal.

Prior Art

Every day, millions of Americans are prescribed a variety of medications by their medical doctors. Whether antibiotics for a temporary malady such as the flu or refills on pills to keep the blood pressure in check, doctor-prescribed medicines are, for many, necessary for continued good health and well-being. As the population ages, they find that the amount of medications they have to take often begins to increase along with their years.

Although polypharmacy, defined as concurrent use of multiple medications by a single patient, may occur in all age groups, it is a common occurrence among the elderly population. In fact, the RN Journal reports that a number of studies conducted during the past 10 years have revealed that patients age 65 and older use an average of two to six prescribed medications on a regular basis. Additionally, children can be very susceptible to frequent illnesses and require multiple medications as well, from cold remedies to battle runny noses and fever during the flu season to daily intake of psychotropic drugs for attention deficit/hyperactivity disorder (ADHD). Concerned about their own health and the health of their children, consumers strive to take and administer all medications as prescribed by diligently following the dosage instructions issued by their doctors.

The challenges of pill-form medicines extend beyond intake; for medical establishments and even for home users, what to do with leftover pills, such as those that have expired or those that are simply not needed? Proper and safe disposal presents a quandary. Left with few options, if any, some home users may just toss remainders in the household garbage.

However, there is the risk that a child or pet may find the discarded pills and swallow them. There is also the chance that pills thrown away will be discovered by "garbage pilferers," or those who root through trash to find discarded valuables. Should the tossed drugs be in the narcotics line, such as OxyContin, Percocet, or Vicodin, among many others, these pills can be abused by the finder, or illegally sold. Some doctor's offices and hospitals choose a different method of disposal: flushing extra pills down the toilet. Unfortunately, this practice releases harmful chemicals into the water supply, exposing millions to potentially dangerous medication ingredients.

Accordingly, a need remains for pill management device in order to overcome at least one aforementioned shortcoming. The exemplary embodiment(s) satisfy such a need by providing a specially designed pill management device, which when fed pills, automatically and conveniently eradicates expired and unused pills, and contains their waste within. Sensor operated and featuring a permanent lock to seal in the powdered waste, which is convenient and easy to use, lightweight yet durable in design, versatile in its applications, and designed for providing consumers and medical professionals with a safer, simpler, and more effective means of medication disposal.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a pill management device, which when fed pills, automatically and conveniently eradicates expired and unused pills, and contains their waste for providing consumers and medical professionals a safer, simpler, and more effective way of medication disposal. These and other objects, features, and advantages of the non-limiting exemplary embodiment(s) are provided by a pill management device including a portable reservoir having a pill-receiving inlet and an access door spaced from the pill-receiving inlet; a pill-crushing mechanism disposed within the reservoir and configured to transform a solid pill, introduced via the pill-receiving inlet, to pill powder; and a locking mechanism in communication with the access door and the pill-receiving inlet for preventing unauthorized access to the pill powder housed within the reservoir. Advantageously, the locking mechanism locks the access door and the pill-receiving inlet.

In a non-limiting exemplary embodiment, the pill-receiving inlet includes a hopper located at a top surface of the reservoir, and a lid pivotally coupled to the hopper.

In a non-limiting exemplary embodiment, the access door includes a plurality of hinges mated to a side wall of the reservoir.

In a non-limiting exemplary embodiment, the pill-crushing mechanism includes a sensor located at the hopper for detecting ingress of the solid pill into the reservoir; a manual first switch located exterior of the reservoir; a power source seated inside the reservoir and electrically coupled to the manual first switch as well as the sensor; and a motor disposed interior of the reservoir and electrically coupled to the manual first switch. Notably, upon detecting a solid pill entering through into the inlet, the sensor generates and transmits a true signal to the power source. In this manner, upon receiving the true signal, the power source is toggled to an activate state. Advantageously, when the manual first switch is at an on position, power is supplied to the motor such that the motor operates.

In a non-limiting exemplary embodiment, the pill-crushing mechanism further includes a plurality of elongated rectilinear shafts juxtaposed subjacent to the inlet and arranged in a parallel configuration. A plurality of rollers are operably coupled to the shafts respectively, wherein each of the rollers has a serrated outer surface suitably configured for crushing the pill. The pill-crushing mechanism further includes a drive belt rotatably coupled to the motor and a first one of the shaft, and a plurality of operably connected driven gears statically engaged with the shafts, respectively. Notably, the driven gears are operably engaged in a side-by-side orientation wherein adjacent ones of the rollers rotate in opposed rotational directions for crushing the solid pill into the pill powder. In this manner, upon operation of the motor, the drive belt causes the first shaft and a third one of the shafts to rotate in a first rotational direction while a second one of the shafts rotates in an opposite second rotational direction.

In a non-limiting exemplary embodiment, the locking mechanism includes a slidable lock affixed to the access door, a lock sensor in communication with the slidable lock wherein the lock sensor generates a true signal when the slidable lock is engaged to a locked position, a magnetic lock in electrical communication with the hopper and the lid, and a second switch electrically coupled to the lock sensor, the power source, and the magnetic lock. Notably, upon receiving the true signal from the lock sensor, the second switch is toggled to an on position and thereby activates the magnetic lock. In this manner, when the lid is engaged with the hopper and the magnetic lock is active, access to the reservoir via the inlet is prohibited due to oppositely charged magnets being attracted to each other.

The present disclosure further includes a method of utilizing a pill management device. Such a method includes the steps of: providing a portable reservoir including a pill-receiving inlet, and an access door spaced from the pill-receiving inlet; providing and disposing a pill-crushing mechanism within the reservoir wherein the pill-crushing mechanism is configured to transform a solid pill, introduced via the pill-receiving inlet, to pill powder; providing and communicating a locking mechanism with the access door and the pill-receiving inlet for preventing unauthorized access to the pill powder housed within the reservoir; and the locking mechanism locking the access door and the pill-receiving inlet.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
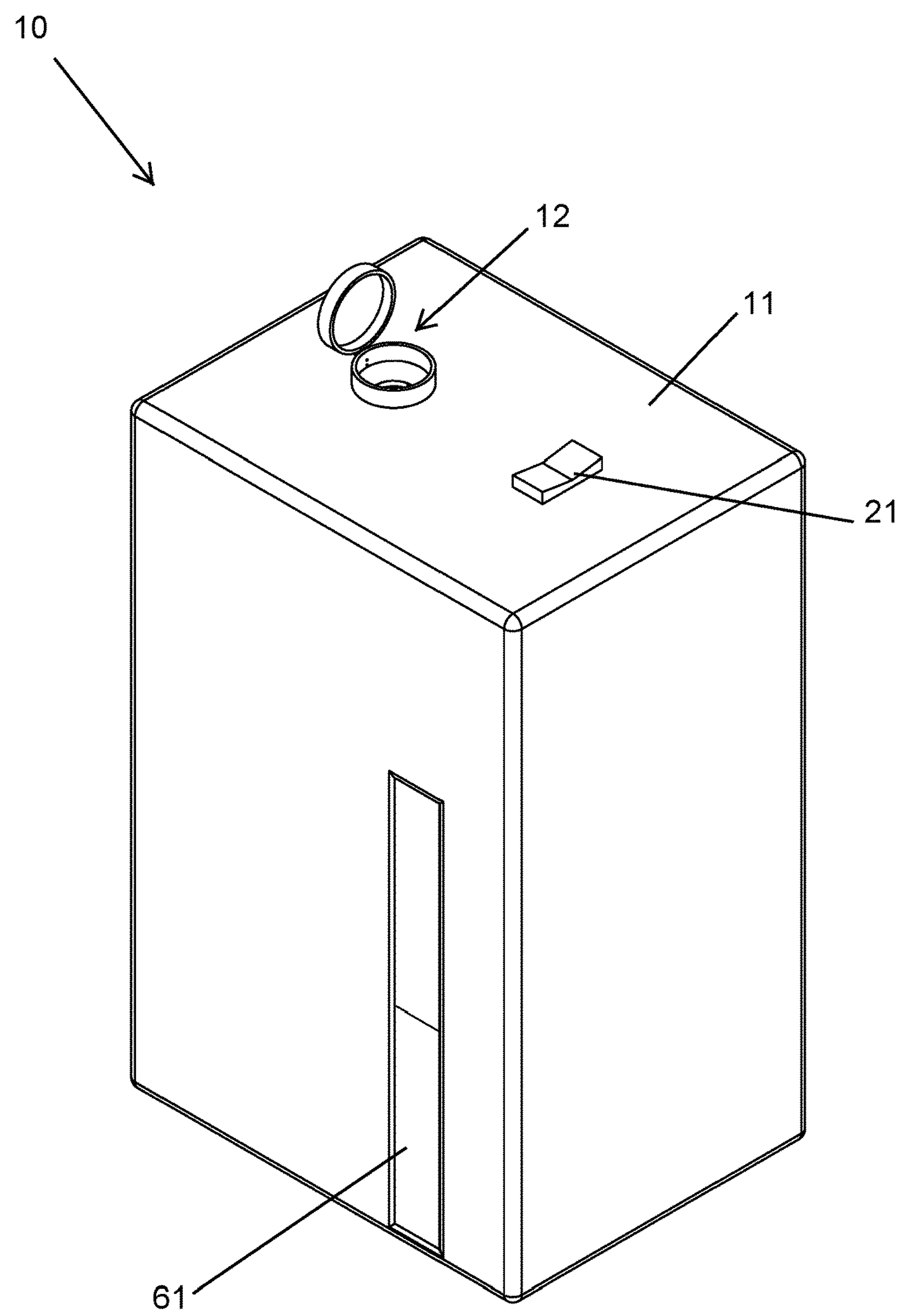
FIG. 1 is a perspective view of a pill management device wherein an access door is closed, in accordance with a non-limiting exemplary embodiment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

Figure 2:
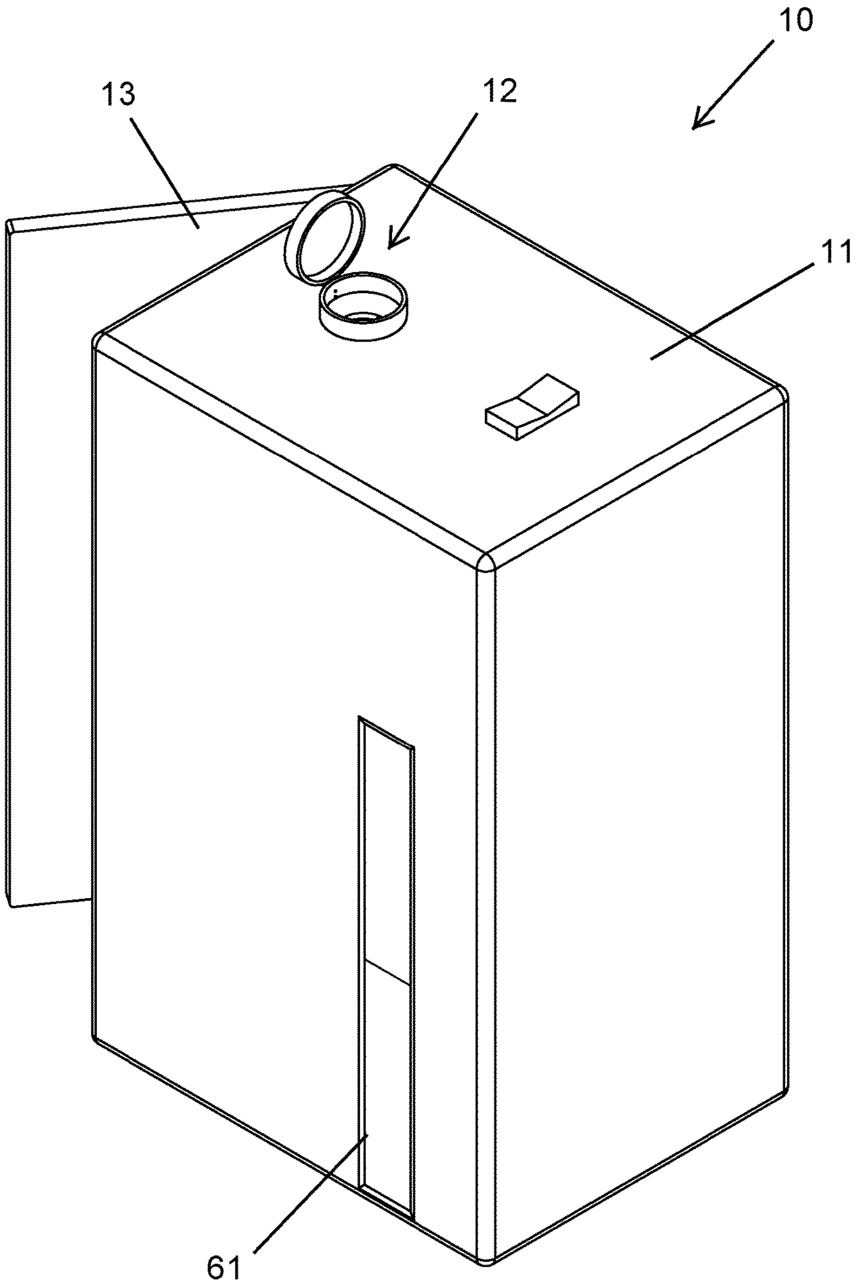
FIG. 2 is a perspective view of the pill management device shown in FIG. 1 wherein the access door is open.
Figure 3:
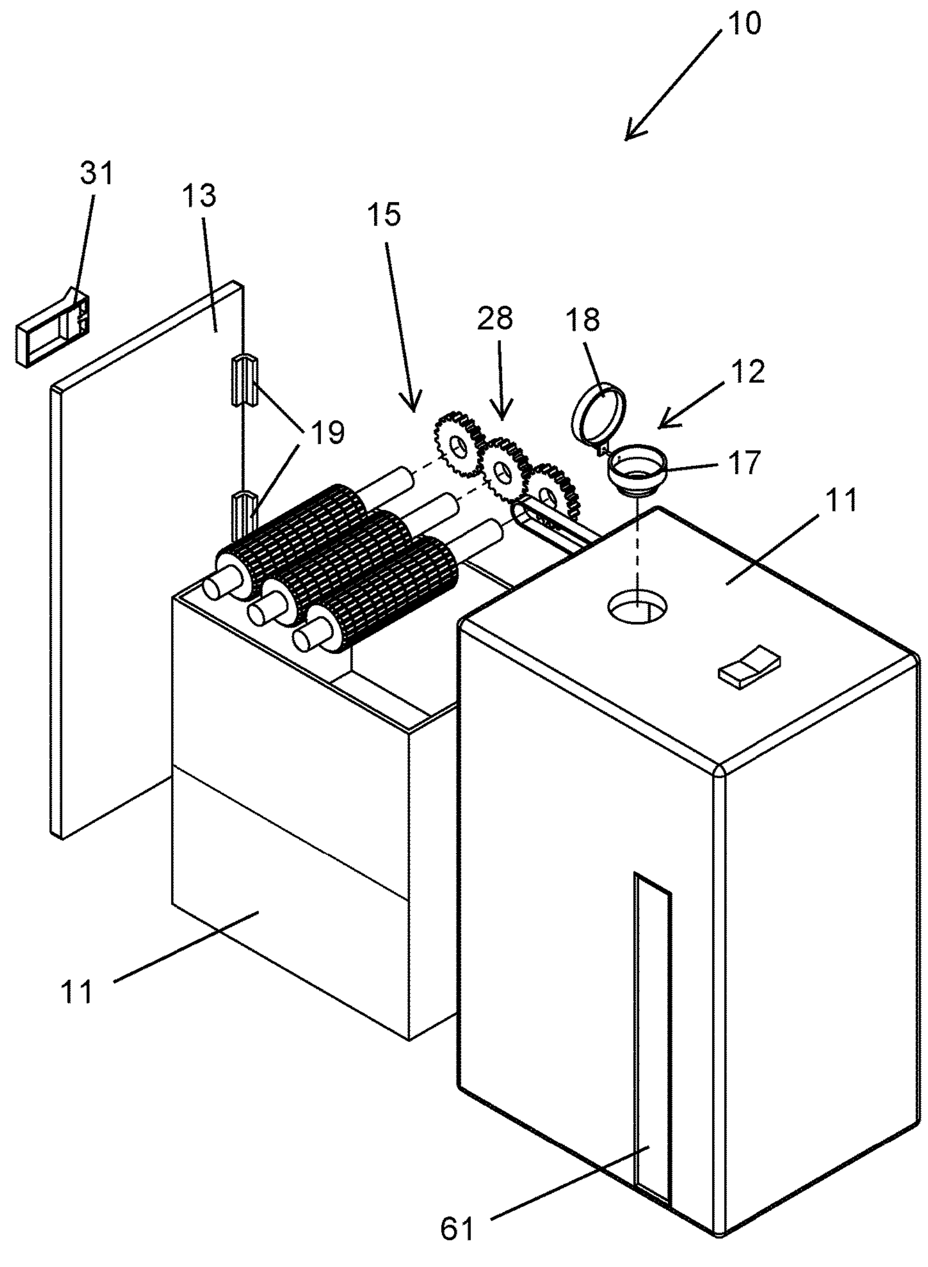
FIG. 3 is an exploded view of the pill management device shown in FIG. 1.
Figure 4:
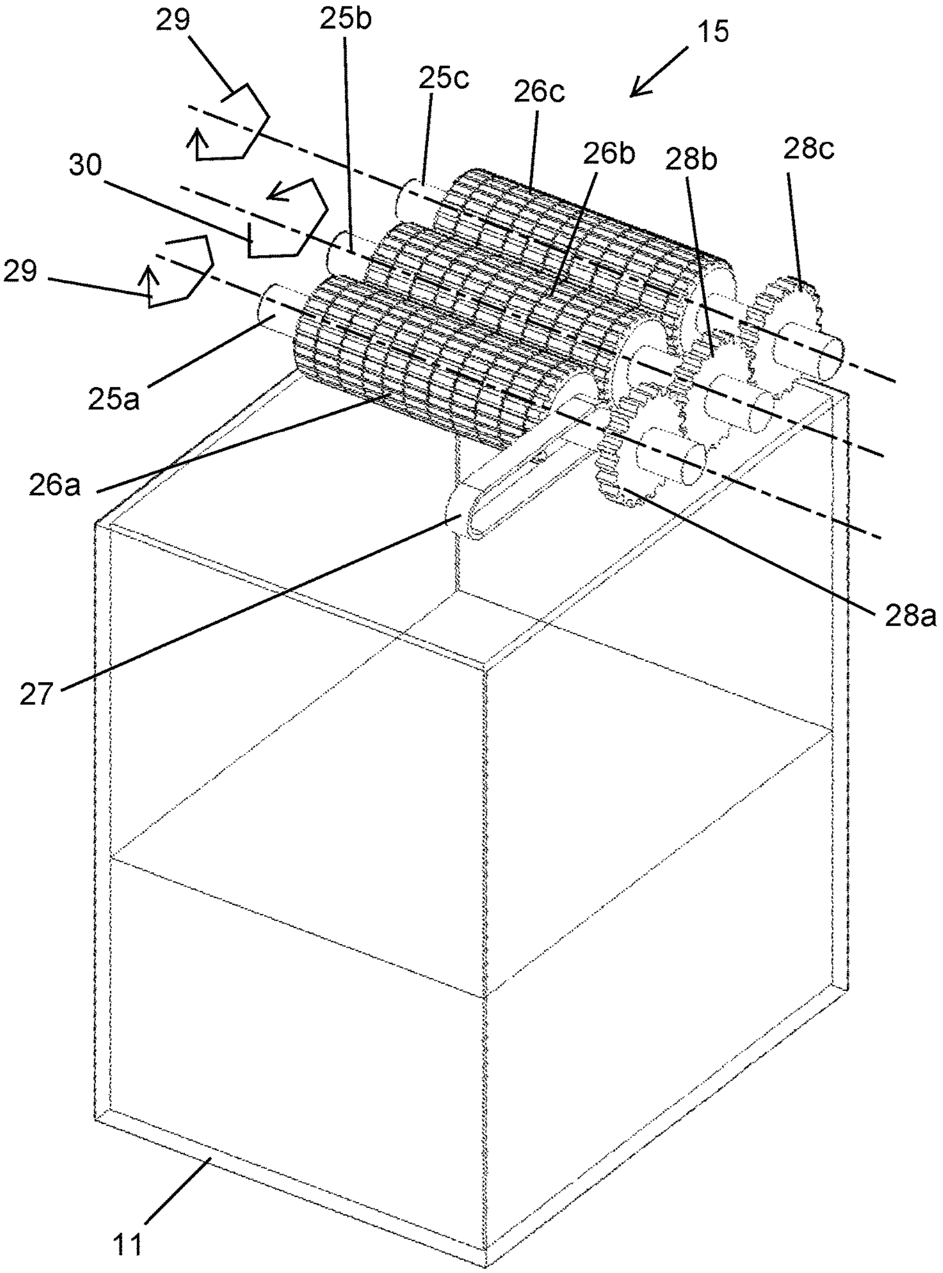
FIG. 4 is a perspective view illustrating the interrelationship between some of the major mechanical components of a pill-crushing mechanism housed inside the reservoir.
Figure 5:
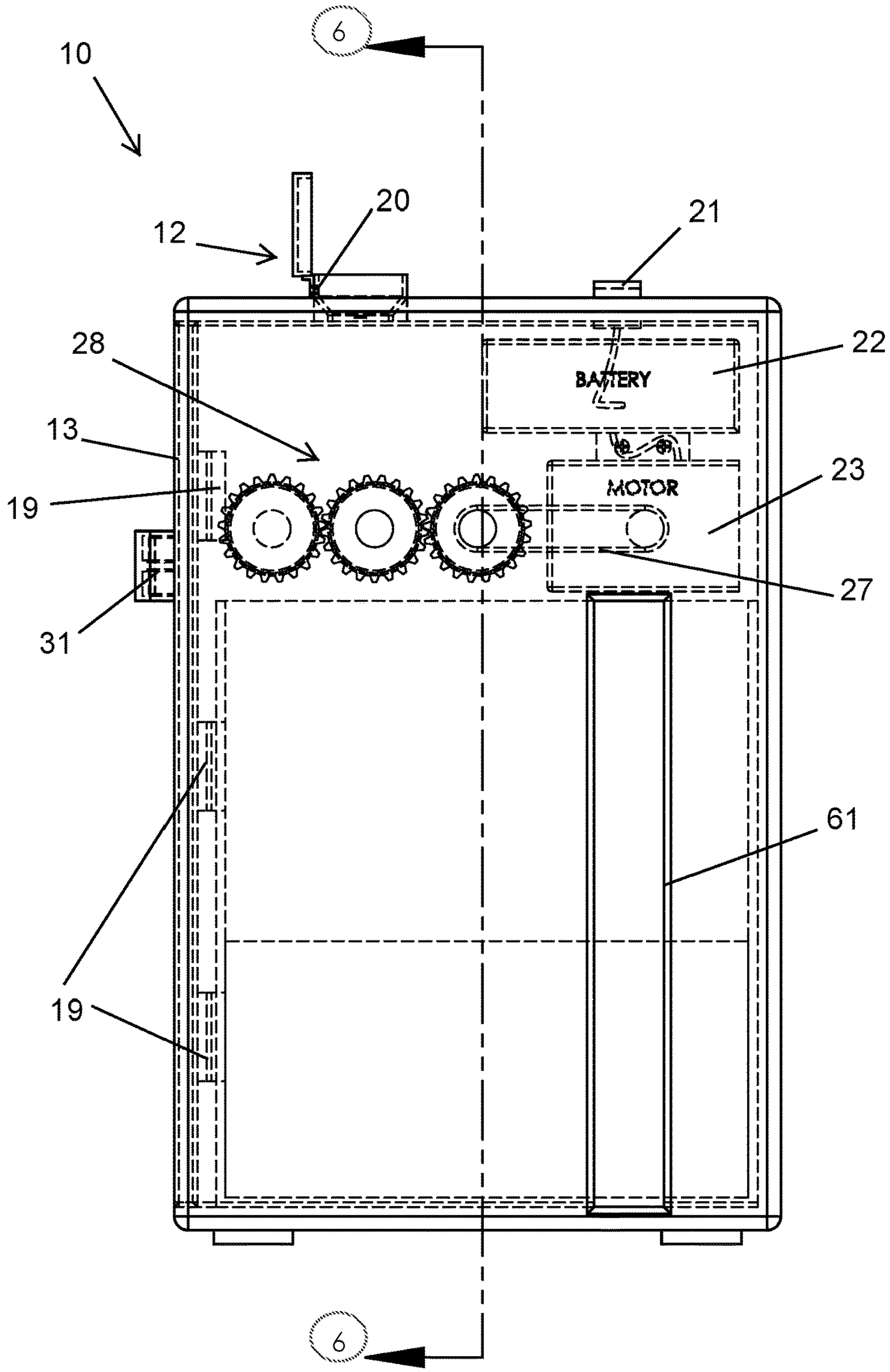
FIG. 5 is a transparent, side elevational view of the pill management device shown in FIG. 1.
Figure 6:
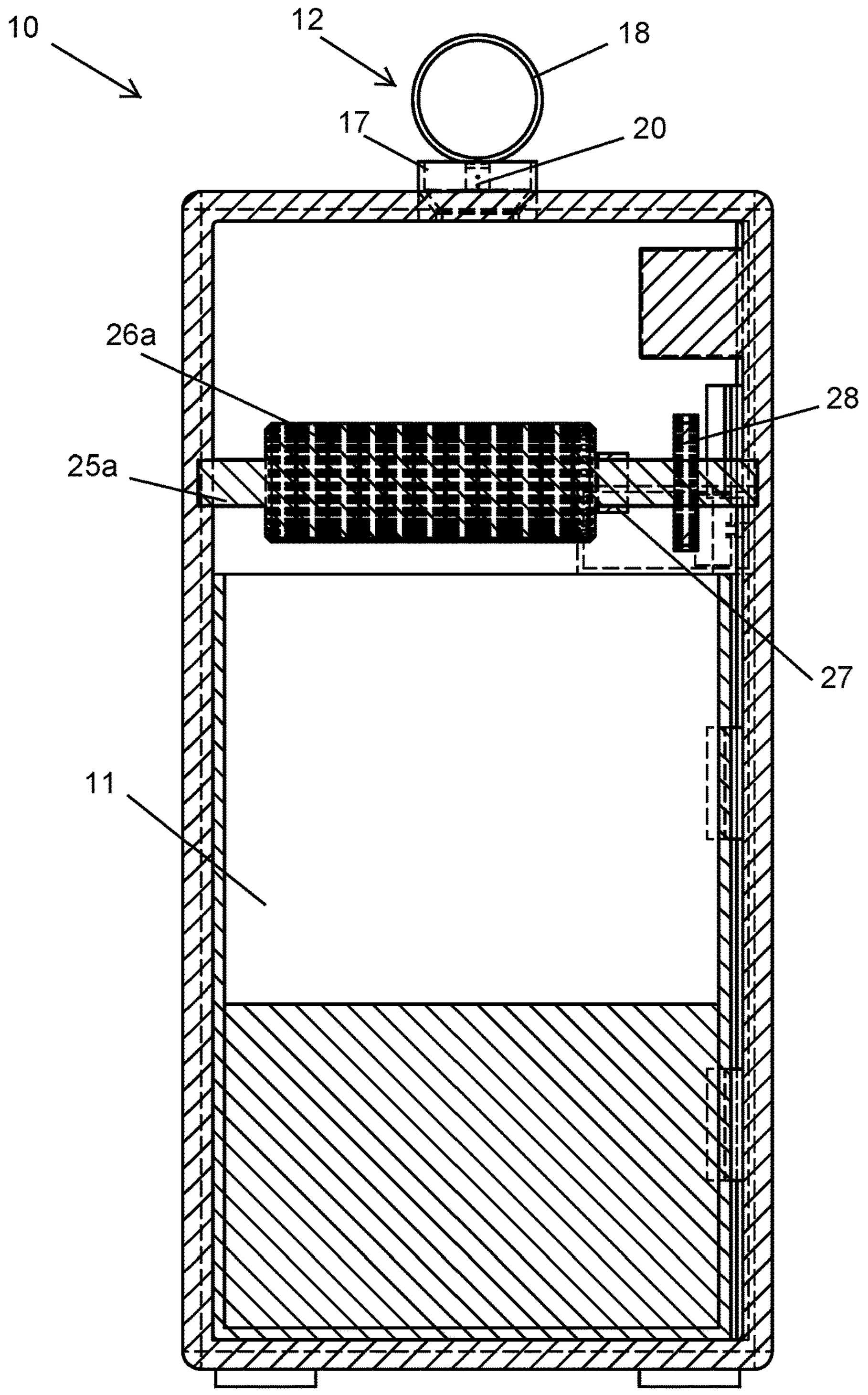
FIG. 6 is a cross-sectional view taken along line 6-6 in FIG. 5.
Figure 7:
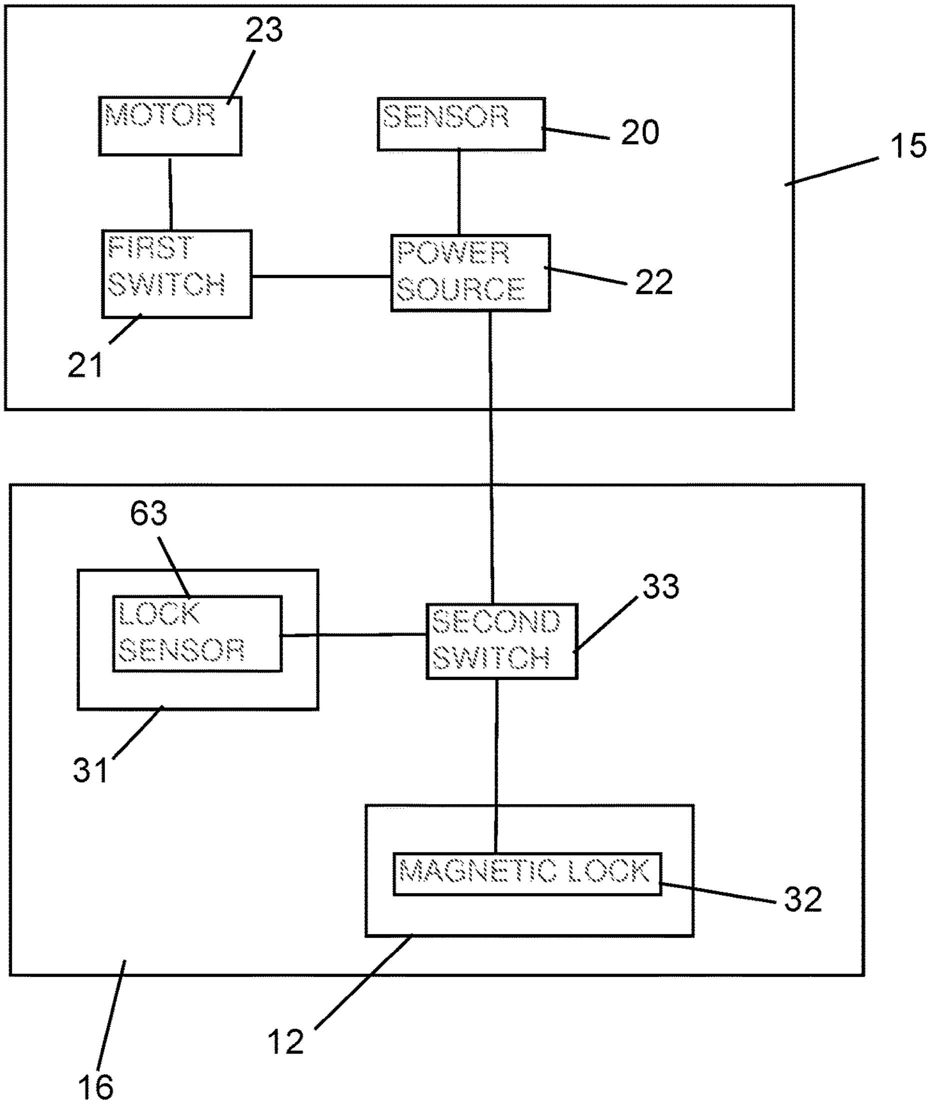
FIG. 7 is a high-level schematic block diagram illustrating the interrelationship between some of the major electrical components of pill-crushing mechanism and locking mechanism, respectively.
Figure 8:
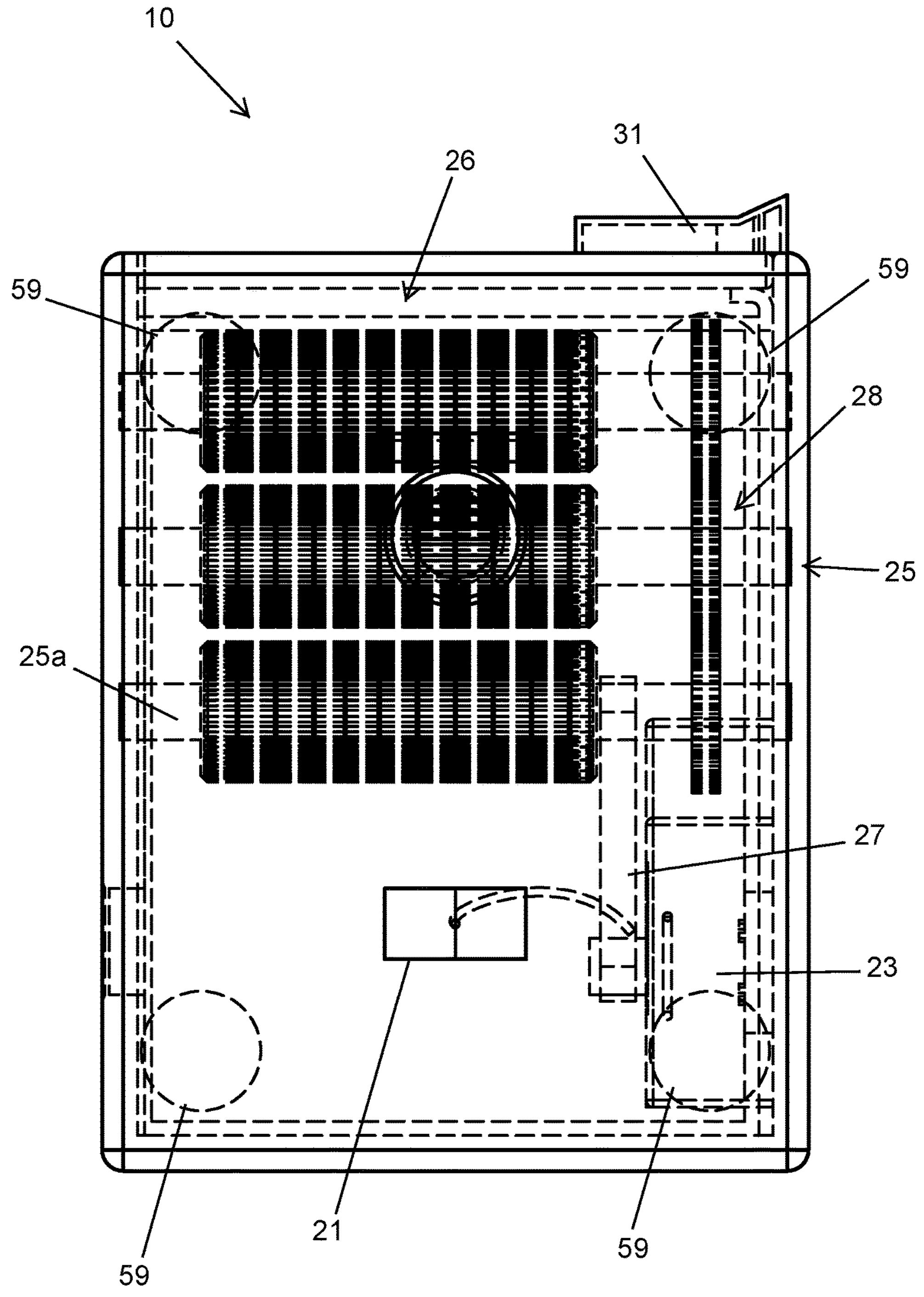
FIG. 8 is a transparent top plan view of the pill management device shown in FIG. 1.
Figure 9:
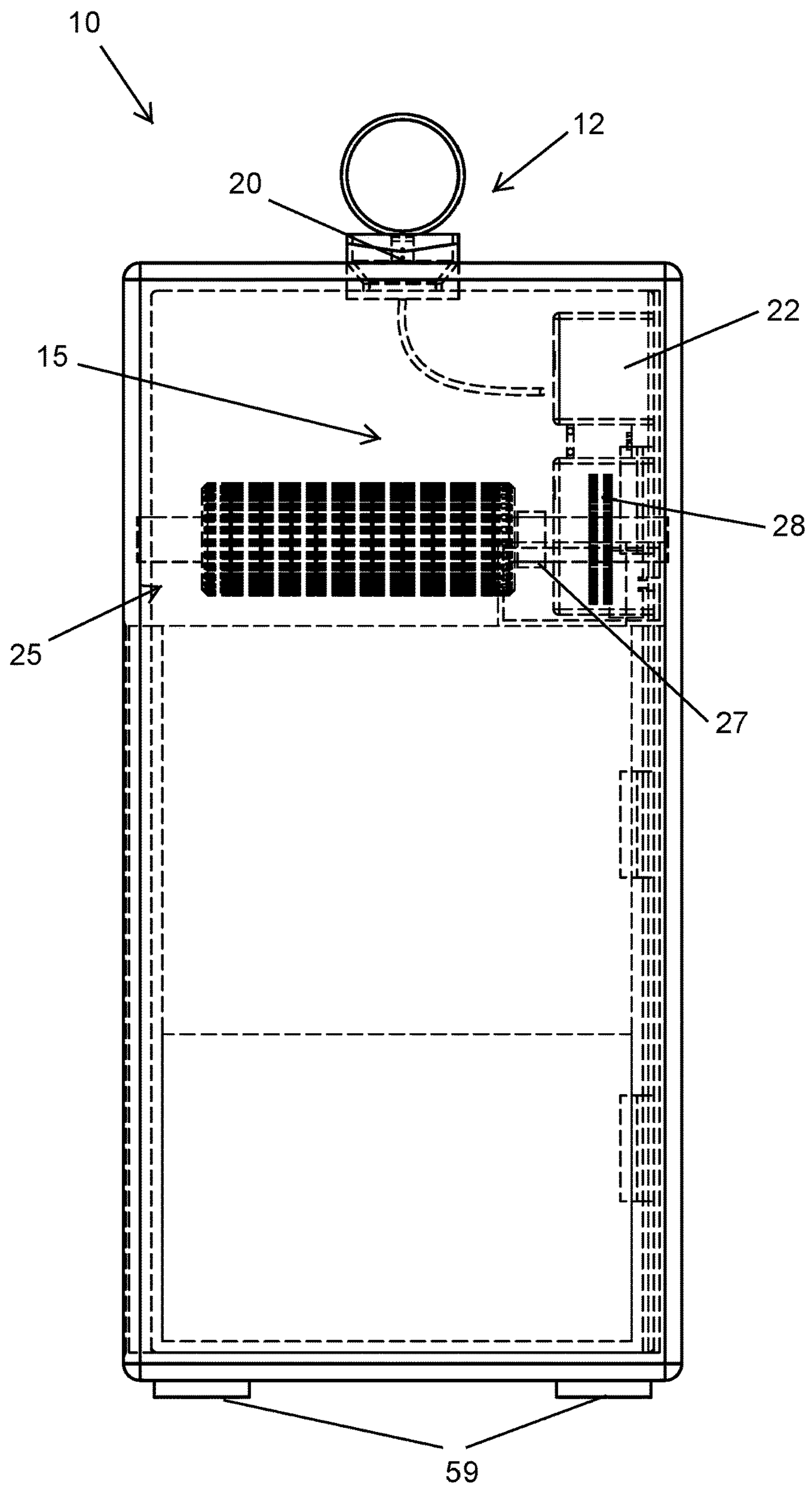
FIG. 9 is a transparent front elevational view of the pill management device shown in FIG. 1.

Non-limiting exemplary embodiment(s) of the present disclosure is/are referred to generally in FIGS. 1-9 and is/are intended to provide a specially designed pill management device 10, which when fed pills, automatically and conveniently eradicates expired and unused pills, and contains their waste within. Sensor operated and featuring a permanent lock to seal in the powdered waste, the pill management device provides consumers and medical professionals with a safer, simpler, and more effective means of medication disposal. It should be understood that the exemplary embodiment(s) may be used to manage a variety of pills, and should not be limited to any particular pill type described herein.

The non-limiting exemplary embodiment(s) is/are referred to generally in FIGS. 1-9 and is/are intended to provide a pill management device 10 including a portable reservoir 11 having a pill-receiving inlet 12 and an access door 13 spaced from the pill-receiving inlet 12, a pill-crushing mechanism 15 disposed within the reservoir 11 and configured to transform a solid pill, introduced via the pill-receiving inlet 12, to pill powder, and a locking mechanism 16 in communication with the access door 13 and the pill-receiving inlet 12 for preventing unauthorized access to the pill powder housed (stored) within the reservoir 11. Advantageously, the locking mechanism 16 locks the access door 13 and the pill-receiving inlet 12.

In a non-limiting exemplary embodiment, a transparent panel 61 may be positioned along a portion of the reservoir 11 to allow a user to view a pill powder level inside reservoir 11.

In a non-limiting exemplary embodiment, the pill-receiving inlet 12 includes a hopper 17 located at a top surface of the reservoir 11, and a lid 18 pivotally coupled to the hopper 17.

In a non-limiting exemplary embodiment, a plurality of support legs 59 are attached to a bottom surface of the reservoir 11 for providing stability and support.

In a non-limiting exemplary embodiment, the access door 13 includes a plurality of hinges 19 mated to a side wall of the reservoir 11.

In a non-limiting exemplary embodiment, the pill-crushing mechanism 15 includes a sensor 20 located at the hopper 17 for detecting ingress of the solid pill into the reservoir 11; a manual first switch 21 located exterior of the reservoir 11; a power source 22 seated inside the reservoir 11 and electrically coupled to the manual first switch 21 as well as the sensor 20; and a motor 23 disposed interior of the reservoir 11 and electrically coupled to the manual first switch 21. Notably, upon detecting a solid pill entering through into the inlet 12, the sensor 20 generates and transmits a true signal to the power source 22. In this manner, upon receiving the true signal, the power source 22 is toggled to an activate state (e.g., normally in an inactivate state to conserve power). Advantageously, when the manual first switch 21 is at an on position, power is supplied to the motor 23 such that the motor 23 operates.

In a non-limiting exemplary embodiment, the pill-crushing mechanism 15 further includes a plurality of elongated rectilinear shafts 25 juxtaposed subjacent to the inlet 12 and arranged in a parallel configuration. A plurality of rollers 26 are operably coupled to the shafts 25 respectively, wherein each of the rollers 26 has a serrated outer surface suitably configured for crushing the pill. The pill-crushing mechanism 15 further includes a drive belt 27 rotatably coupled to the motor 23 and a first one of the shafts **25*a*, and a plurality of operably connected driven gears 28 statically engaged with the shafts 25, respectively. Notably, the driven gears 28 are operably engaged in a side-by-side orientation wherein adjacent ones of the rollers rotate in opposed rotational directions for crushing the solid pill into the pill powder (e.g., 26*a*, 26*c* rotate in an opposite rotational direction to 26*b*). In this manner, upon operation of the motor 23, the drive belt 27 causes the first shaft 25*a* and a third one of the shafts 25*c* to rotate in a first rotational direction 29 (e.g., clockwise) while a second one of the shafts 25*b* rotates in an opposite second rotational direction 30** (e.g., counter clockwise).

In a non-limiting exemplary embodiment, the locking mechanism 16 includes a slidable lock 31 affixed to the access door 13, a lock sensor 63 in communication with the slidable lock 31 wherein the lock sensor 63 generates a true signal when the slidable lock 31 is engaged to a locked position (e.g., broken tab, etc.), a magnetic lock 32 in electrical communication with the hopper 17 and the lid 18, and a second switch 33 electrically coupled to the lock sensor 63, the power source 22, and the magnetic lock 32. Notably, upon receiving the true signal from the lock sensor 63, the second switch 33 is toggled to an on position and thereby activates the magnetic lock 32. In this manner, when the lid 18 is engaged with the hopper 17 and the magnetic lock 32 is active, access to the reservoir 11 via the inlet 12 is prohibited (e.g., opposed magnetic polarities attracted to each other).

In a non-limiting exemplary embodiment, when the permanent slidable lock 31 is actuated, a security plate may be slidably displaced subjacent to the inlet 12 thereby effectively blocking access to the reservoir 11 after access door 13 is locked. Such a security plate may be power driven by an actuation mechanism in communication with the slidable lock 32 and power source 22.

The present disclosure further includes a method of utilizing a pill management device 10. Such a method includes the steps of: providing a portable reservoir 11 including a pill-receiving inlet 12, and an access door 13 spaced from the pill-receiving inlet 12; providing and disposing a pill-crushing mechanism 15 within the reservoir 11 wherein the pill-crushing mechanism 15 is configured to transform a solid pill, introduced via the pill-receiving inlet 12, to pill powder; providing and communicating a locking mechanism 16 with the access door 13 and the pill-receiving inlet 12 for preventing unauthorized access to the pill powder housed within the reservoir 11; and the locking mechanism 16 locking the access door 13 and the pill-receiving inlet 12.

Referring to FIGS. 1-9 general, in a non-limiting exemplary embodiment(s), the specially designed pill management device 10 conveniently and safely disposes expired and unused pills, crushing these medications into a useless powder form. This product may be a battery powered, motorized, stainless steel unit configured to complete the above function in one action. Featuring an attractive, sleek rectangular shape, the pill management device 10 is a compact and lightweight appliance, offered in sizes appropriate for both home and commercial applications.

The pill management device 10 has an internal motor 23 located on one side of the device 10. This motor 23 drives the pill-crushing mechanism 15. An inlet 12, located at the top of the device, offers the area in which pills are fed. Located directly beneath this inlet 12 is a series of rolling bars, which provide crushing capabilities. The pill management device 10 also contains a receptacle for securely housing the powdered-form pills, along with an external level indicator. The device 10 may be easily cleaned between uses, ensuring there is no inadvertent cross-contamination.

There are several significant benefits and advantages associated with this clever product. For example, the pill management device 10 provides consumers with an effective, safe, and user-friendly means to achieve pill disposal with one convenient appliance. Featuring a motorized grinder system, this creative appliance ensures that excess and expired pills are completely destroyed. As a result, users need not worry of the dangers of improper medication disposal, such as tossing pills in the trash or flushing them down the toilet, the latter of which is an environmentally hazardous practice. This product also prevents the abuse of disposed drugs by crafty thieves, allowing both consumers and medical professionals to staunch illegal consumption and selling of medications. Extremely easy to use, pill management device 10 pulverizes hard, bulky pills in a matter of seconds. Universally designed and constructed, the pill management device 10 is sure to accommodate virtually any user, regardless of physical capability. Made of durable, high quality materials, this product should withstand years of continued use.

The pill management device 10 is an innovative product that effectively eases the burdens that taking medications can sometimes entail. Destroying harmful pill ingredients, this user-friendly product is ideal for any medical establishment or home.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A pill management device comprising:
a portable reservoir including
a pill-receiving inlet, and
an access door spaced from said pill-receiving inlet;
a pill-crushing mechanism disposed within said reservoir and being configured to transform a solid pill, introduced via said pill-receiving inlet, to pill powder; and
a locking mechanism in communication with said access door and said pill-receiving inlet for preventing unauthorized access to the pill powder housed within said reservoir;
wherein said locking mechanism locks said access door and said pill-receiving inlet;
wherein said pill-receiving inlet comprises
a hopper located at a top surface of said reservoir; and
a lid pivotally coupled to said hopper;
wherein said access door comprises: a plurality of hinges mated to a side wall of said reservoir;
wherein said pill-crushing mechanism comprises
a sensor located at said hopper for detecting ingress of the solid pill into said reservoir;
a manual first switch located exterior of said reservoir;
a power source seated inside said reservoir and electrically coupled to said manual first switch as well as said sensor; and
a motor disposed interior of said reservoir and electrically coupled to said manual first switch;
wherein, upon detecting a solid pill entering through into said inlet, said sensor generates and transmits a true signal to said power source;
wherein, upon receiving said true signal, said power source is toggled to an activate state;

wherein, when said manual first switch is at an on position, power is supplied to said motor such that said motor operates;

wherein said pill-crushing mechanism further comprises a plurality of elongated rectilinear shafts juxtaposed subjacent to said inlet and arranged in a parallel configuration;

a plurality of rollers operably coupled to said shafts respectively, each of said rollers having a serrated outer surface suitably configured for crushing the pill;

a drive belt rotatably coupled to said motor and a first one of said shafts;

a plurality of operably connected driven gears statically engaged with said shafts, respectively, wherein said driven gears are operably engaged in a side-by-side orientation; and wherein, upon operation of said motor, said drive belt causes said first shaft and a third one of said shafts to rotate in a first rotational direction while a second one of said shafts rotates in an opposite second rotational direction;

wherein adjacent ones of said rollers rotate in opposed rotational directions for crushing the solid pill into the pill powder;

wherein said locking mechanism comprises a slidable lock affixed to said access door;

a lock sensor in communication with said slidable lock, said lock sensor generating a true signal when said slidable lock is engaged to a locked position;

a magnetic lock in electrical communication with said hopper and said lid; and a second switch electrically coupled to said lock sensor, said power source, and said magnetic lock;

wherein, upon receiving said true signal from said lock sensor, said second switch is toggled to an on position and thereby activates said magnetic lock;

wherein, when said lid is engaged with said hopper and said magnetic lock is active, access to said reservoir via said inlet is prohibited.

2. A method of utilizing a pill management device, said method comprising the steps of:

providing a portable reservoir including a pill-receiving inlet, and an access door spaced from said pill-receiving inlet;

providing and disposing a pill-crushing mechanism within said reservoir, said pill-crushing mechanism being configured to transform a solid pill, introduced via said pill-receiving inlet, to pill powder;

providing and communicating a locking mechanism with said access door and said pill-receiving inlet for preventing unauthorized access to the pill powder housed within said reservoir; and said locking mechanism locking said access door and said pill-receiving inlet;

wherein said pill-receiving inlet comprises a hopper located at a top surface of said reservoir; and a lid pivotally coupled to said hopper;

wherein said access door comprises: a plurality of hinges mated to a side wall of said reservoir;

wherein said pill-crushing mechanism comprises a sensor located at said hopper for detecting ingress of the solid pill into said reservoir;

a manual first switch located exterior of said reservoir;

a power source seated inside said reservoir and electrically coupled to said manual first switch as well as said sensor; and a motor disposed interior of said reservoir and electrically coupled to said manual first switch;

wherein, upon detecting a solid pill entering through into said inlet, said sensor generates and transmits a true signal to said power source;

wherein, upon receiving said true signal, said power source is toggled to an activate state;

wherein, when said manual first switch is at an on position, power is supplied to said motor such that said motor operates;

wherein said pill-crushing mechanism further comprises a plurality of elongated rectilinear shafts juxtaposed subjacent to said inlet and arranged in a parallel configuration;

a plurality of rollers operably coupled to said shafts respectively, each of said rollers having a serrated outer surface suitably configured for crushing the pill;

a drive belt rotatably coupled to said motor and a first one of said shafts;

a plurality of operably connected driven gears statically engaged with said shafts, respectively, wherein said driven gears are operably engaged in a side-by-side orientation; and wherein, upon operation of said motor, said drive belt causes said first shaft and a third one of said shafts to rotate in a first rotational direction while a second one of said shafts rotates in an opposite second rotational direction;

wherein adjacent ones of said rollers rotate in opposed rotational directions for crushing the solid pill into the pill powder;

wherein said locking mechanism comprises a slidable lock affixed to said access door;

a lock sensor in communication with said slidable lock, said lock sensor generating a true signal when said slidable lock is engaged to a locked position;

a magnetic lock in electrical communication with said hopper and said lid; and a second switch electrically coupled to said lock sensor, said power source, and said magnetic lock;

wherein, upon receiving said true signal from said lock sensor, said second switch is toggled to an on position and thereby activates said magnetic lock;

wherein, when said lid is engaged with said hopper and said magnetic lock is active, access to said reservoir via said inlet is prohibited.

* * * * *